(12) United States Patent  
McCann

(10) Patent No.: US 8,773,706 B2  
(45) Date of Patent: Jul. 8, 2014

(54) APPARATUS, SYSTEMS, AND METHODS FOR DYNAMIC LANGUAGE CUSTOMIZATION

(75) Inventor: Tim McCann, Longmont, CO (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 792 days.

(21) Appl. No.: 12/749,293

(22) Filed: Mar. 29, 2010

(65) Prior Publication Data

US 2011/0235122 A1   Sep. 29, 2011

(51) Int. Cl.  
*G06K 15/00* (2006.01)

(52) U.S. Cl.  
USPC .......................................................... 358/1.16

(58) Field of Classification Search  
None  
See application file for complete search history.

(56) References Cited

U.S. PATENT DOCUMENTS

| | | | |
|---|---|---|---|
| 2002/0143523 A1* | 10/2002 | Balaji et al. ....................... 704/8 |
| 2006/0206304 A1* | 9/2006 | Liu .................................... 704/2 |
| 2008/0301277 A1* | 12/2008 | Tsujiguchi ..................... 709/223 |
| 2010/0005080 A1* | 1/2010 | Pike et al. ......................... 707/4 |
| 2010/0100843 A1* | 4/2010 | Lee et al. ....................... 715/810 |

* cited by examiner

*Primary Examiner* — Fan Zhang  
(74) *Attorney, Agent, or Firm* — Osha Liang LLP

(57) ABSTRACT

Methods disclosed facilitate the dynamic addition of language support for peripherals. In some embodiments, peripherals may read in language strings in a previously unsupported language from a data file and populate memory locations with the strings. The memory locations may be logically addressed using an index value associated with the previously unsupported language and identifier associated with the string. In some embodiments, the identifier associated with the string in the previously unsupported language may correspond to the identifier associated with a translated equivalent of the string in a language that is natively supported by the printer.

18 Claims, 3 Drawing Sheets ical function peripherals, or other similar devices, and
may include physical and functional combinations of the
devices mentioned above.

APPARATUS, SYSTEMS, AND METHODS FOR DYNAMIC LANGUAGE CUSTOMIZATION

BACKGROUND

1. Field of the Invention

The present invention relates to the field of computer peripherals and in particular, to systems and methods for dynamically customizing peripherals such as printers to support languages.

2. Description of Related Art

Computer peripherals, such as printers, typically have an operator panel or a console, which can be used to display messages and accept input from users. The peripherals may be configured to support one or more languages natively during manufacturing. Typically, the languages supported are those spoken by people in major markets where the printer is sold. For example, a printer may be configured to support English, Spanish, French, and Portuguese natively. A user operating a printer with native support for the above languages may be presented with a menu that enables selection of one of the above languages when the printer is booted up. Menus and messages displayed on the operator control panel or console will then be shown in the selected language.

However, if the peripheral above is to be sold in a new market where the languages used are not currently supported by the peripheral, then some form of reconfiguration may be performed to permit the peripheral to support the additional languages. For instance, in the example above, if entry into the new market (Japan) is facilitated by support for Japanese in a printer, then installation of Japanese may be undertaken for the printers sold in Japan. In many instances, the reconfiguration may require the services of a field engineer, which may delay printer deployment and also increase sales costs. In addition, delay in providing native support may prevent quick customer adoption of the printer in the new market. Accordingly, there is a need for systems and methods that facilitate the dynamic customization of peripherals, including printers, to support additional languages in a manner that is transparent to users.

SUMMARY

Consistent with embodiments disclosed herein, systems and methods for the dynamic customization of peripherals, including printers, are presented. In some embodiments, a method to dynamically add language support to a peripheral device, comprises: storing a set of index values, wherein at least one index value is associated with a first language supported by the peripheral device and wherein the first language comprises a plurality of strings and a string in the first language is addressed logically by the index value associated with the first language and a distinct identifier associated with the string; dynamically assigning one of the stored index values to a second language comprising a plurality of strings when strings in the second language are read; and storing each string in the second language in a memory location that is logically addressed by the index value associated with the second language and an identifier associated with the string.

Embodiments disclosed also relate to apparatus that provide the capability to dynamically add language support, as well as methods to dynamically add language support to peripherals using software, firmware, and program instructions created, stored, accessed, or modified by processors using computer-readable media or computer-readable memory. These and other embodiments are further explained below with respect to the following figures.

DETAILED DESCRIPTION

In accordance with embodiments disclosed herein, systems and methods for dynamic customization of peripherals, including printers, are presented. In the examples below, the exemplary peripheral discussed is a printer. However, the system may be generalized to other various peripherals such as scanners, imaging devices, display devices, monitors, multi-function devices, etc. as would be apparent to one of ordinary skill in the art.

Figure 1:
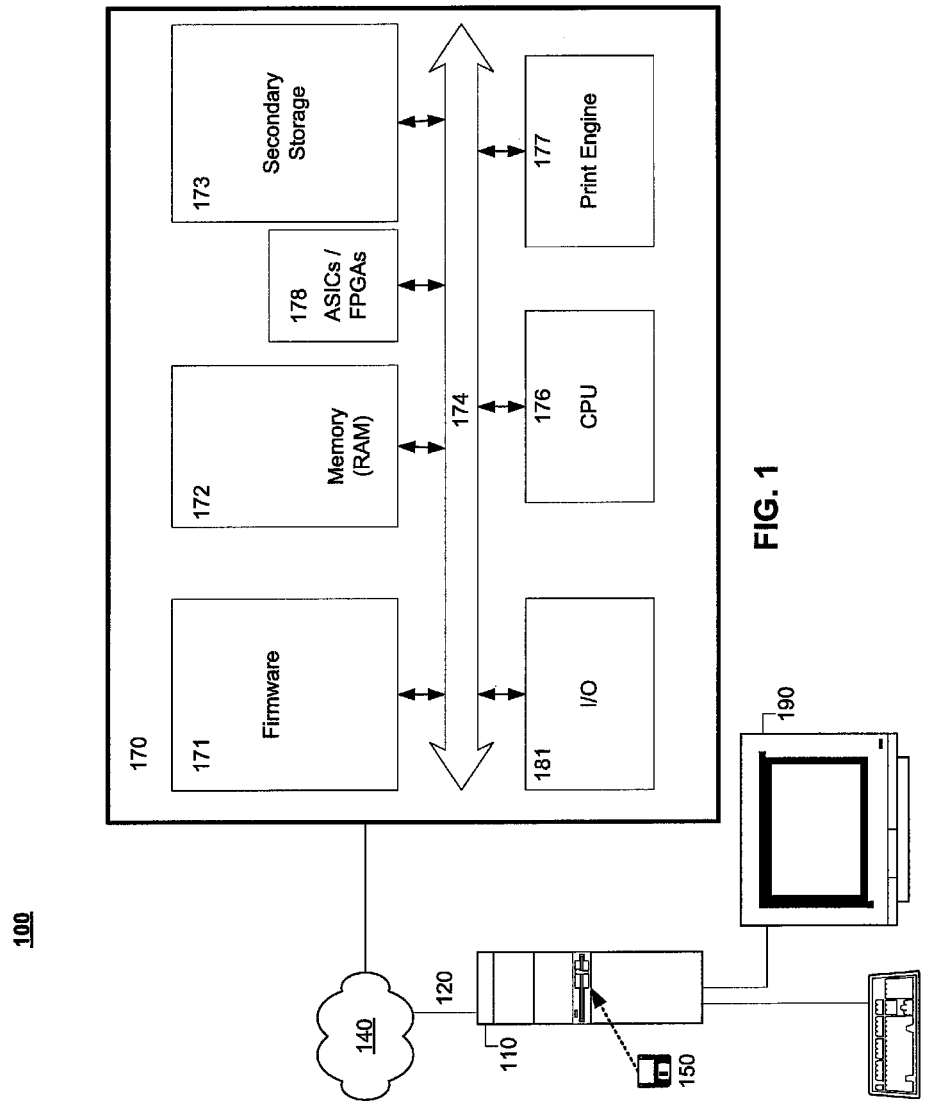
FIG. 1 shows a high-level block diagram of an exemplary system for the dynamic customization of an exemplary peripheral, shown as a printer.

FIG. 1 shows a high-level block diagram of an exemplary system 100 for dynamic customization of printers. In general, a computer software application for dynamic customization of peripherals such as printers may be deployed on a network of computers 110 and printers 170 that are connected through communication links that allow information to be exchanged using conventional communication protocols and/or data port interfaces.

As shown in FIG. 1, exemplary system 100 includes computer or computing device 110 and printer 170, which are coupled using network 140. Network 140 may include subnets, Local Area Networks (LANs), and/or Wide Area Networks (WANs). Further, network 140 may also include modems, routers, repeaters, and other communication devices (not shown) that permit peripherals that are coupled to a network 140 to communicate with other devices over wired or wireless connections in accordance with the policies set by a network administrator.

In general, computing device 110 may be a computer workstation or desktop computer, laptop or portable computer, handheld device, or any other mobile computing device capable of being used in a networked environment. Computing device 110 and printer 170 may be capable of executing software (not shown) that facilitates the dynamic customization of printer 170 and other peripherals in a manner consistent with disclosed embodiments.

Computing device 110 and printer 170 may contain removable media drives 150. Removable media drives 150 may include, for example, 3.5 inch floppy drives, CD-ROM drives, DVD ROM drives, CD±RW or DVD±RW drives, USB flash drives, Memory Sticks™, Secure Digital High Capacity ("SDHC") cards, and/or any other removable media drives consistent with embodiments of the present invention. Portions of software applications may reside on removable media and be read and executed by computing device 110 using removable media drive 150. In some embodiments, intermediate and final results and/or reports generated by applications may also be stored on removable media.

Printers 170 may be laser printers, ink jet printers, LED printers, plotters, and of various other types. From a functional perspective, printers 170 may take the form of computer printers, facsimile machines, digital copiers, multi-function devices, and/or various other devices that are capable of printing documents.

Connection 120 couples computing device 110 and printer 170 to network 140. Connection 120 may be implemented as a wired or wireless connection using appropriate conventional communication protocols and/or data port interfaces. In general, connection 120 can be any communication channel that allows transmission of data between the devices. In one embodiment, for example, devices may be provided with data ports, such as USB™, SCSI, FIREWIRE™, and/or BNC ports for transmission of data through the appropriate connection 120. The communication links could be wireless links or wired links or any combination that allows communication between computing device 110 and printer 170.

Printer 170 may be controlled by hardware, firmware, or software, or some combination thereof. A computer software application for dynamic customization of peripherals may be deployed on one or more of exemplary computer 110 and/or printer 170, as shown in FIG. 1. For example, printer 170 may execute software or firmware that permits printer 170 to perform dynamic language customizations in a manner consistent with disclosed embodiments. In another example, an application for dynamic language customization may be resident on computer 110 and operate on printer 170. In general, applications may execute in whole or in part on one or more computer 110 and/or printers 170 in the system. The embodiments described herein are exemplary only and other embodiments and implementations will be apparent to one of ordinary skill in the art.

Exemplary printer 170 may contain bus 174 that couples CPU 176, firmware 171, memory 172, input-output ("I/O") module 181, print engine 177, and secondary storage device 173. Exemplary printer 170 may also contain other Application Specific Integrated Circuits (ASICs), and/or Field Programmable Gate Arrays (FPGAs) 178 that are capable of executing portions of an application to permit language customization dynamically. In some embodiments, exemplary printer 170 may also be capable of executing software including, a printer operating system, dynamic language customization routines, parsing and conversion routines, database management software, software to process print job requests, printer status requests, printer configuration software, as well as other appropriate application software.

Exemplary I/O module 181 may also permit communication with computer 110 over network 140. Information received from computer 110 and/or print controllers 175 may be processed by I/O module 181 and stored in memory 172. I/O module 181 may also notify CPU 176 about the communications. The communications may include data, commands, information pertaining to the location and formatting of language data files, capability requests, status requests, responses, and/or acknowledgements according to the protocol being used. CPU 176 may retrieve any information stored in memory 172 and process the information further.

Exemplary CPU 176 may be a general-purpose processor, a special purpose processor, or an embedded processor. CPU 176 can exchange data including control information and instructions with memory 172 and/or firmware 171. Memory 172 may be any type of Dynamic Random Access Memory ("DRAM") such as but not limited to SDRAM, or RDRAM. Firmware 171 may hold instructions and data including but not limited to a boot-up sequence, pre-defined routines including routines for dynamic language customizations, processing incoming requests and messages, composing outgoing responses and messages, routines for configuration management, routines for document processing, and other code. In some embodiments, code and data in firmware 171 may be copied to memory 172 prior to being acted upon by CPU 176. Data and instructions in firmware 171, including any language customization information, may be upgradeable using one or more of computer 110, network 140, removable media coupled to printer 170, and/or secondary storage 173.

Exemplary CPU 176 may act upon instructions and data and provide control and data to ASICs/FPGAs 178 and print engine 177 to generate printed documents. ASICs/FPGAs 178 may also provide control and data to print engine 177. FPGAs/ASICs 178 may also implement one of configuration management, dynamic language customization, message processing, and other print related algorithms. Intermediate and final printable data, messages, printer status, and configuration information pertaining to one or more printers 170 may be stored in memory 172 or secondary storage 173.

Figure 2:
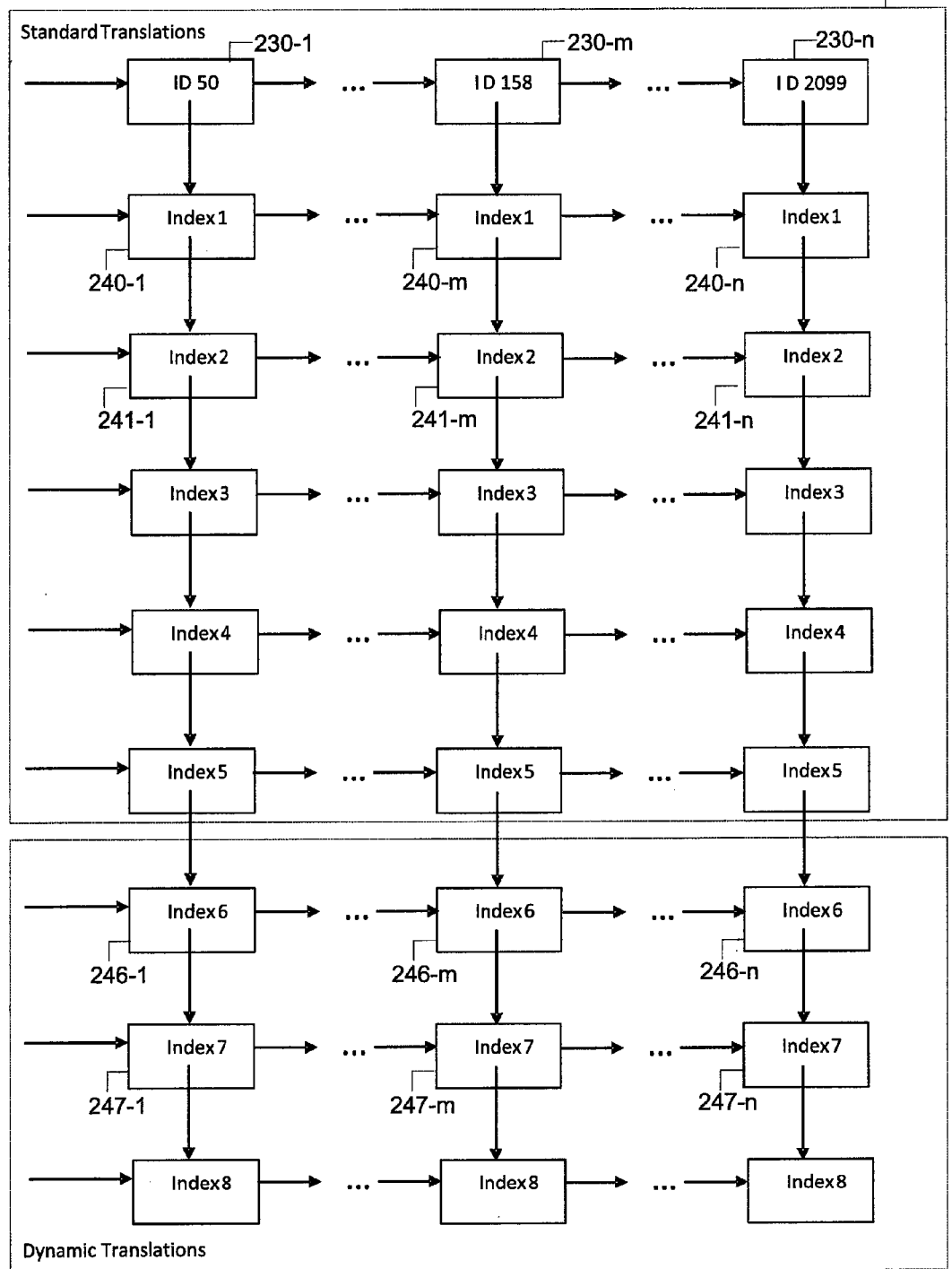
FIG. 2 shows an exemplary logical organization of data that facilitates dynamic language customization of peripherals.

FIG. 2 shows an exemplary logical structure 200 to facilitate dynamic language customization of peripherals. Logical structure 200 may include a first index associated with a language and a distinct identifier (which may be a second index) associated with a string in the language. In some embodiments, a memory location that holds a string in a language may be logically addressed using the index value associated with a language and the identifier associated with a string in that language. For example, in one implementation, (1, 50) may logically address $50^{th}$ string in the language identified by index value 1. In some embodiments, the strings may be held in a complex data structure and the index pair (1, 50) may be used to compute the location of a particular string.

As shown in FIG. 2, each distinct string in a peripheral device may be associated with an identifier 230 (which can be an index). In FIG. 2, the distinct strings are shown as 230-1, 230-2 . . . 230-$m$, . . . and 230-$n$. For example, the distinct string "UPPER" (which may occur in the context of an upper tray of a printer) in English may be associated with an identifier of "50", and the language English may be associated with an index value of "1" as shown in FIG. 2. In some embodiments, the string "UPPER" may be logically addressed as (1, 50).

In some embodiments, a translation of the string "UPPER" in another language may then be determined using the identifier ("50") associated with "UPPER" and the index value associated with the other language. In one embodiment, the identifier "50" and the index value associated with another language may be used to compute a memory address where the equivalent of "UPPER" in another language may be found. For example, the location logically addressed by (2, 50) 240-1 may hold the French equivalent of "UPPER". Similarly, the location logically addressed by (3, 50) 240-3 may hold the Italian equivalent of "Upper". Note that not every location associated with a language may be populated. For example, the location logically addressed as (5, 50) may be empty and can indicate the absence of an equivalent for "UPPER" in the language associated with index value 5.

For example, in one implementation, a string for 'Upper' could be defined using identifier ID '50' 230-1 with the following language indices:
   1—English as 'UPPER'
   2—French as 'SUPERIEUR'
   3—Italian as 'SUPERIORE'
   4—German as 'OBEN'
   5—Spanish as 'SUPERIOR'
By setting the default language to German, printer 170 may use the index value "4" associated with German to obtain strings to be displayed. Accordingly, to obtain the German translation for 'UPPER', printer 170 could access the location logically addressed as (4, 50), and retrieve the string 'OBEN'.

In some embodiments, logical structure 200 may be implemented as part of a data structure, where the co-ordinates (X, Y) could be used to compute the location holding the translation of the string identified by identifier Y for the language identified by index X. Note that logical structure 200 shown in FIG. 2 is exemplary only and various other possibilities are envisaged as would be apparent to one of ordinary skill in the art. In some embodiments, the logical structure 200 may be implemented using look-up tables.

Conventionally, many printers 170 may include one or more data structures that hold data shown in logical structure 200. String translation data for widely used languages in the areas where the printer is sold may be stored in firmware 171 in printer 170. Such languages may be viewed as natively supported by printer 170. For example, languages such as English, Spanish, French etc. may be stored in firmware 171 in printer 170. When printer 170 is booted up, the user may be presented with an option to select from one of the stored natively supported languages. In other implementations, a default language or the last specified language may be chosen during boot-up and the user may invoke menu options to change the language to another supported language using a console or operator control panel.

For example, as shown in FIG. 2, Standard Translations section 210, which may reside in firmware 171, may hold translation data for one or more supported and widely used languages. In conventional printers, which are limited to standard translations section 210, the inclusion of a previously unsupported language may involve installation of new firmware, which includes translation strings for the previously unsupported languages. New firmware often requires separate testing, qualification and may need to be loaded into firmware 171 by sales or field service engineers. In addition to being expensive, such reconfiguration may also limit the ability of a manufacturer to quickly respond to customer demands in new markets.

In some embodiments consistent with disclosures herein, logical structure 200 may also include a dynamic translations section 220 that may hold translation strings in additional languages. In some embodiments, dynamic translations section 220 may include one or more additional index values 246, 247, etc. These additional index values (such as index values 246, 247 etc) may be stored on printer 170. Entries associated with the index values may be populated (or repopulated) with translation strings to include support for previously unsupported languages. In some embodiments, additional indexes 246, 247 etc. in dynamic translations section 220 may be populated or repopulated when the printer is running, or dynamic translations section 220 may be populated during boot-up. In some embodiments, dynamic translations section 220 may reside in memory 172, or may reside in rewriteable non-volatile memory used by firmware 171.

In some embodiments, memory may be made available to hold index entries 246-1, 246-2, ... 246-$m$, ... and 246-$n$ but dynamic translations section 220 may not have been populated with translation strings initially. For example, memory for dynamic translations section 220 may have been made available in a rewriteable Non-Volatile RAM (NVRAM) at the time of manufacture but the locations may not have been populated with translation strings. In one implementation, code running on printer 170 may be invoked to look for one or more data files, which may include translation strings in additional languages. The translation strings may be used to populate index entries in dynamic translations section 220.

In some embodiments, data files, which hold the translation strings, may be stored at specified locations. In some embodiments, the location of the data files may be specified in firmware and/or may be input by the user. In some embodiments, the location and protocol used to retrieve the data files may be specified using a Uniform Resource Locator ("URL"). Upon locating the data files, printer 170 may populate (or re-populate) indexes 246, 247 etc. with the translation strings in the data file. The data files may be located in secondary storage 173, on computer 110, or on removable media coupled to computer 110 or printer 170. In some embodiments, the data files may be located on storage coupled to computer 110 (or a server) accessible over a network such as the Internet. In one implementation, a separate data file may be provided for each additional language. For example, translation strings for additional languages 246 may be stored in one data file, while translation strings for language 247 may be stored in another data file.

In some embodiments, in addition to the translation strings, the contents of the data file may include one or more of: number of translation strings for the language, identifier (ID) associated with each translation string, and the length of each translation string. For example, the data file may include a block of 3 pieces for each index entry—the ID number, the length of the dynamic translation string to be read in, and the translation string to be inserted. In another implementation, a format for the data files holding translation strings may be pre-specified.

Figure 3:
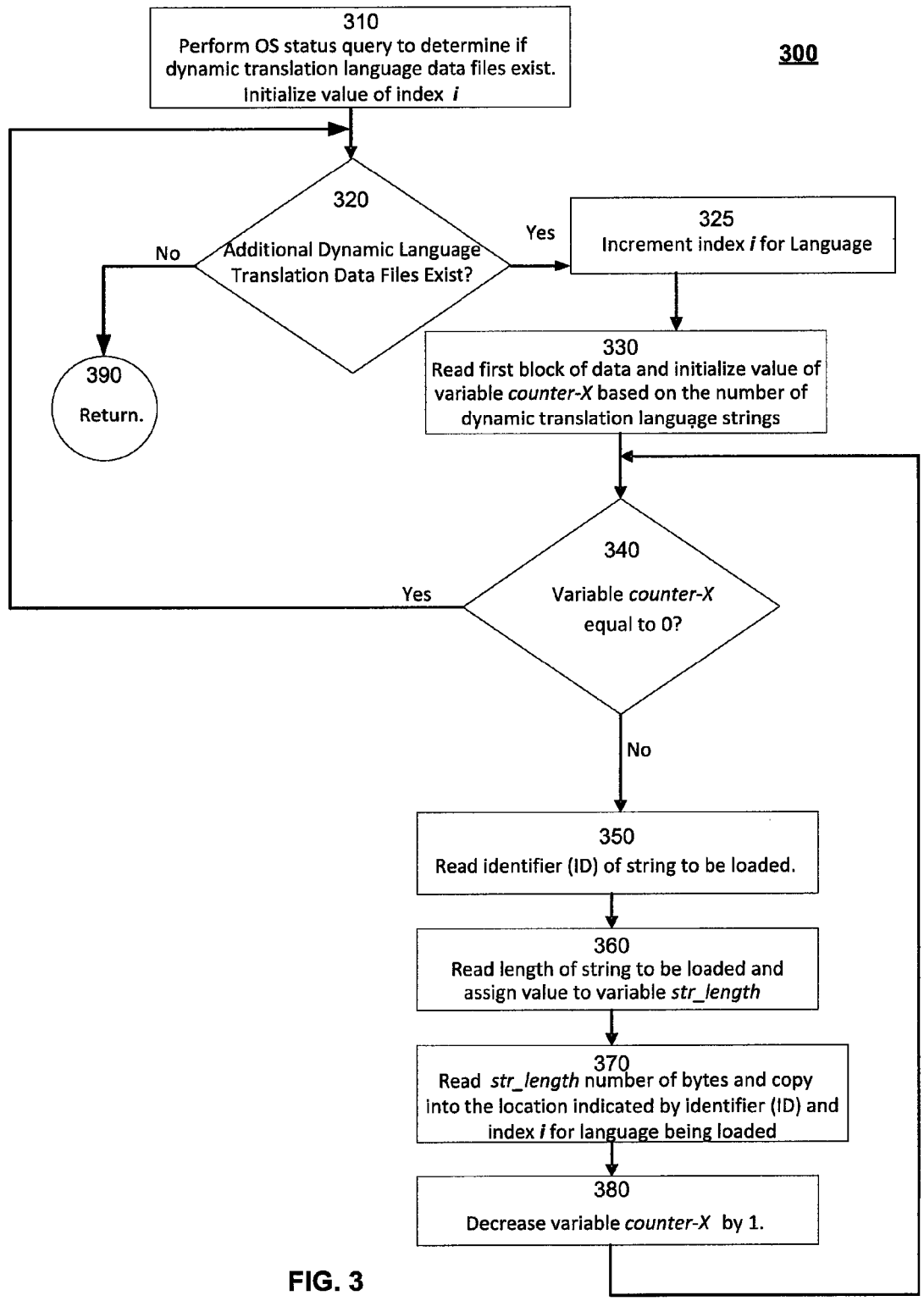
FIG. 3 shows a flowchart illustrating an exemplary method for dynamically customizing peripherals to support additional languages.

FIG. 3 shows a flowchart illustrating an exemplary method 300 for dynamically customizing peripherals to support additional languages. In some embodiments, method 300 may be part of firmware 171 and may be invoked during boot-up of printer 170. In some embodiments, method 300 may be invoked during normal operation of printer 170 and may be performed without the printer being re-booted or restarted. For example, a user may invoke method 300 using menus provided on the operator control panel. In some embodiments, code implementing method 300 may be stored on computer readable media and/or secondary storage 172. In some embodiments, program code that implements method 300 may be executed by CPU 176. In some embodiments, method 300 may be invoked when printer 170 is running using menu options displayed in an operator control panel or a console coupled to printer 170.

When method 300 is invoked, in step 310, the operating system ("OS"), which may be the printer operating system, may be queried to determine if dynamic language translation data files exist. In some embodiments, the operating system may respond and provide a location where dynamic language translation data files are stored. In some embodiments, the printer operating system may prompt the user to enter the location where dynamic language translation data files are stored and the user may enter the location using an operator control panel or console coupled to printer 170. In some embodiments, value of index i may be initialized based on the number of currently supported languages. For example, if the printer already supports 4 languages, then the value of index i may be set to 4.

If one or more dynamic data files exist at the specified location ("Y", in step 320) then, in step 325, the value of index i may be incremented. In step 330, the first block of data or a header in one of the dynamic language translation data files may be read to determine the number of translation strings present in the data file. The value of a counter, which is shown as 'counter-X' in FIG. 3, may be initialized based on the number of dynamic translation strings.

In step 340, if the value of counter-X (representing the number of dynamic translation strings) is non-zero ("N", in step 340) then, in step 350, the identifier (ID) of the translation string to be loaded may be read. In step 350, the length of the translation string to be loaded may be read and assigned to str_length. In some embodiments, str_length may specify the length of the translation string currently being read in bytes. In step 370, the translation string, which may comprise the next str_length bytes in dynamic translation data file may be read and stored into the location identified by (i, ID).

Next, in step 390, the value of counter-X may be decremented and the algorithm may return to step 340 to begin another iteration. If the value of counter-X is zero ("N", in step 340), then, the algorithm can proceed to step 320. In step 320, the algorithm may check whether additional dynamic translation data files are present. If no additional dynamic translation data files are present, then, the algorithm may return control to the calling routine in step 390.

In some embodiments, a program for conducting the process described in algorithms 400 can be recorded on computer-readable media 150 or computer-readable memory. These include, but are not limited to, Read Only Memory (ROM), Programmable Read Only Memory (PROM), Flash Memory, Non-Volatile Random Access Memory (NVRAM), or digital memory cards such as secure digital (SD) memory cards, Compact Flash™, Smart Media™, Memory Stick™, and the like. In some embodiments, one or more types of computer-readable media may be coupled to printer 170. In certain embodiments, portions of a program to implement the systems, methods, and structures disclosed may be delivered over network 140.

Other embodiments of the present invention will be apparent to those skilled in the art from consideration of the specification and practice of one or more embodiments of the invention disclosed herein. It is intended that the specification and examples be considered as exemplary only, with a true scope and spirit of the invention being indicated by the following claims.

What is claimed is:

1. A method for dynamically adding language support to a peripheral device comprising a processor, firmware, and at least one memory, the method performed by the processor comprising:
    storing in the at least one memory of the peripheral device, data relating to at least one supported language received from the firmware, wherein each supported language is represented by an index value and a plurality of strings of a language, each string having a distinct identifier, and each string is addressed logically by the index value associated with the supported language and a distinct identifier associated with the string;
    detecting, in secondary storage, a data file corresponding to an unsupported language, the data file comprising a plurality of strings of a language for the unsupported language;
    dynamically assigning an index value to the unsupported language;
    computing a storage location in the memory for each string in the unsupported language using the string identifier and the index value assigned to the unsupported language; and
    storing each string in the unsupported language in the computed memory storage location.

2. The method of claim 1, wherein the method is performed during the boot-up sequence of the peripheral device.

3. The method of claim 1, wherein the peripheral device is a printer.

4. The method of claim 1, wherein the data file includes the identifier associated with each string and the length of each string.

5. The method of claim 4, wherein the data file is stored in secondary storage coupled to the peripheral device.

6. The method of claim 1, wherein the method is performed while the peripheral device is operating and without requiring the device to be re-booted.

7. A computer peripheral comprising:
    a computer-readable memory, wherein the memory contains data relating to at least one supported language received from the firmware, wherein each supported language is represented by an index value and a plurality of strings of a language, each string having a distinct identifier, and each string is logically addressed based on the index value associated with the supported language and a distinct identifier associated with the string in the supported language;
    a secondary storage device coupled to a processor, where the storage device stores a data file corresponding to an unsupported language, the data file comprising a plurality of strings of a language for the unsupported language; and
    a processor coupled to the memory and the storage device, wherein the processor performs the steps of:
        storing in the computer-readable memory, data relating to at least one supported language received from the firmware,
        detecting a data file in the storage device corresponding to an unsupported language,
        dynamically assigning an index value to the unsupported language,
        computing a storage location in the memory for each string in the unsupported language using the string identifier and the index value assigned to the unsupported language, and storing each string in the unsupported language in the computed memory storage location.

8. The peripheral device of claim 7, wherein the data file also includes the identifier associated with each string and information pertaining to the length of each string.

9. The peripheral device of claim 7, wherein the secondary storage device is removable media coupled to the peripheral device.

10. The peripheral device of claim 7, wherein the secondary storage device is a hard drive coupled to the peripheral device.

11. The peripheral device of claim 7, wherein the secondary storage device is coupled to the peripheral device over a network.

12. The peripheral device of claim 11, wherein the network includes the Internet.

13. The peripheral device of claim 7, wherein the peripheral device is a printer.

14. A non-transitory computer-readable medium including program instructions, which when executed by a computer, perform steps in a method to dynamically add language support to a peripheral device comprising a processor, firmware and at least one memory, the method performed by the computer comprising:
    storing in the at least one memory of the peripheral device, data relating to at least one supported language received from the firmware, wherein each supported language is represented by an index value and a plurality of strings of a language, each string having a distinct identifier, and each string is addressed logically by the index value associated with the supported language and a distinct identifier associated with the string;

detecting, in secondary storage, a data file corresponding to an unsupported language, the data file comprising a plurality of strings of a language for the unsupported language;

dynamically assigning an index value to the unsupported language;

computing a storage location in the memory for each string in the unsupported language using the string identifier and the index value assigned to the unsupported language; and storing each string in the unsupported language in the computed memory storage location.

15. The non-transitory computer-readable medium of claim 14, wherein the peripheral device is a printer.

16. The non-transitory computer-readable medium of claim 14, wherein the data file includes the identifier associated with each string and the length of each string.

17. The non-transitory computer-readable medium of claim 16, wherein the data file is stored on a secondary storage media coupled to the peripheral device.

18. The non-transitory computer-readable medium of claim 14, wherein the method is performed while the peripheral device is operating and without requiring the device to be re-booted.

* * * * *